United States Patent [19]

Hongu

[11] Patent Number: 5,351,265
[45] Date of Patent: Sep. 27, 1994

[54] GAS LASER OSCILLATION DEVICE AND AN OPTICAL AXIS ALIGNMENT METHOD THEREFOR

[75] Inventor: Hitoshi Hongu, Kobe, Japan

[73] Assignee: Matsushita Electric Industrial Co., Ltd., Osaka, Japan

[21] Appl. No.: 156,977

[22] Filed: Nov. 24, 1993

Related U.S. Application Data

[63] Continuation of Ser. No. 811,031, Dec. 20, 1991, abandoned.

[30] Foreign Application Priority Data

Dec. 20, 1990 [JP] Japan .................. 2-404183

[51] Int. Cl.⁵ .............................. H01S 3/08
[52] U.S. Cl. .................... 372/107; 372/65; 372/93; 372/81; 372/55
[58] Field of Search .............. 372/65, 61, 106, 93, 372/107, 92, 55

[56] References Cited

U.S. PATENT DOCUMENTS

| | | | |
|---|---|---|---|
| 4,602,372 | 7/1986 | Sasaki et al. | 372/61 |
| 4,646,336 | 2/1987 | Koseki | 372/65 |
| 4,660,209 | 4/1987 | Osada et al. | 372/58 |
| 4,680,771 | 7/1987 | Koseki | 372/65 |
| 4,751,720 | 6/1988 | Koop | 372/107 |
| 4,805,072 | 2/1989 | Ackermann et al. | 372/82 |
| 4,878,227 | 10/1989 | Ackermann et al. | 372/65 |

FOREIGN PATENT DOCUMENTS 0109025 5/1984 European Pat. Off. .
59-29181 2/1984 Japan .

Primary Examiner—Léon Scott, Jr.
Attorney, Agent, or Firm—Wenderoth, Lind & Ponack

[57] ABSTRACT

A gas laser oscillator has two discharge tube columns, both ends of which are connected by a bending unit, wherein each column comprises two discharge tubes connected in series. At the opposite ends of the bending unit, one column has a total-reflection mirror, and the other column has a partial-reflection mirror. These discharge tubes, the bending unit, the total-reflection mirror, and the partial-reflection mirror are mounted to a single optical bench. Each end of the discharge tubes is fixed to the optical bench by a clamp. When counted from the clamp nearest to the partial-reflection mirror, the first clamp, the fourth clamp, and the eighth clamp are non-movable with respect to the optical bench, while the remaining clamps are movable, and thus adjustable. One total-reflection mirror unit of the two total-reflection mirror units on the bending unit is non-movable, and the other total-reflection mirror unit is movable.

4 Claims, 7 Drawing Sheets

GAS LASER OSCILLATION DEVICE AND AN OPTICAL AXIS ALIGNMENT METHOD THEREFOR

This application is a continuation of now abandoned application, Ser. No.07/811,031, filed on Dec.20,1991.

BACKGROUND OF THE INVENTION

1. Field of the Invention

The present invention relates to a gas laser oscillation device in which the axis of each discharge tube is aligned with the axis of a laser. In particular, the present invention relates to a gas laser oscillation device and an optical axis alignment adjustment method for the device, wherein the gas laser oscillation device comprises an optical resonance zone having two or more columns of discharge tubes which are connected at their bending portions by means of a bending unit, with each column made up of one or more discharge tubes which are connected in series, with a partial-reflection mirror at one end of the optical resonance zone and with a total-reflection mirror at the other end of the optical resonance zone.

2. Description of the Related Art

FIG. 8 illustrates the basic configuration of a gas laser oscillation device. Indicated at 1 in FIG. 8.is a discharge tube made of a dielectric material such as glass and the like. Indicated at 2 and 3 are metallic electrodes disposed in the discharge tube 1. A high tension power supply 4 is connected to the electrodes 2 and 3. The power supply 4 supplies, for example, a voltage of 30 kV across the electrodes 2 and 3. Indicated at 5 is a discharge space between the electrodes 2 and 3 in the discharge tube 1. A total-reflection mirror is designated 6, and a partial-reflection mirror is designated 7. An optical resonator is formed by the total-reflection mirror 6 disposed on one side of the discharge space 5, and by the partial-reflection mirror 7 disposed on the other side of the discharge space 5. A laser beam 8 is output via the partial-reflection mirror 7. An arrow 9 indicates the direction of gas flow. Laser gas circulates in the axial flow type laser device. A gas feeder pipe is designated 10. Heat exchangers 11 and 12 work to lower the laser gas temperature which rises as a result of discharge action in the discharge space 5 and the operation of a gas blower. The blower 13 is used to circulate the laser gas. The blower 13 causes a gas flow of about 100 m/s to take place in the discharge space 5.

The basic structure of the axial flow type gas laser oscillation device has been described above. Described below is how it operates.

The high tension power supply 4 supplies a high voltage between a pair of metallic electrodes 2 and 3, resulting in glow discharge in the discharge space 5. The laser gas that passes through the discharge space 5 receives energy from the discharge, and is thus excited. The excited laser gas is put into a state of resonance in the optical resonator formed by the total-reflection mirror 6 and the partial-reflection mirror 7. The resulting laser beam 8 is output through the partial-reflection mirror 7. The laser beam 8 is then used for welding, cutting, heat treatment, and other applications.

FIGS. 9A and 9B are a detailed view showing a conventional optical resonator portion of a gas laser oscillation device. Mounted on an optical resonator are an optical bench 14, clamps 16 and 17, discharge tubes 1, a bending unit 18, a partial-reflection mirror 7, and a total-reflection mirror 6. All of the clamps 16 are adjustable. Also mounted on the optical resonator is an adjuster 22 which aligns the optical axis by adjusting two total-reflection mirrors disposed on the bending unit 18. Specifically, a reference optical axis is first set up, and then, all of the clamps 16 and the total-reflection mirrors disposed on the bending unit are adjusted so that the optical axes of all optical elements agree with the reference optical axis. As described later with reference to FIG. 5, the clamps 16 are fitted into the optical bench 14 with a clearance fit. The clamps 16 are adjustable to within the clearance range which is allowed by clamp mounting screws (not shown) and their holes. The clamps 17 are integrally mounted on the discharge tube 1 as shown in FIG. 3; thus, the clamps 17 are installed along with the discharge tube 1 in order to fit into the clamps 16 after they are adjusted.

The following is a description of how the conventional optical axis alignment is adjusted. Indicated at 25 in FIG. 6 and at 26 in FIG. 11 are instruments which are used to visually inspect the position of the optical axis and which, made of translucent material, at their centers, have through holes 27a and 27b, respectively, of 0.5 to 1 mm diameter. Similar to the manner illustrated in FIG. 7, the instrument 25 may be installed on the clamp 24 on the mounting portion of the partial-reflection mirror 7. Both the accuracy of fit between the instrument 25 and the clamp 24 and the accuracy of fit between the clamp and the optical bench 14 are far better than an optical axis misalignment level normally considered as acceptable. As shown in FIG. 12, the instrument 26 is inserted into a hole (31 in FIG. 10) with the incidence side total-reflection mirror (28 in FIG. 10) of the bending unit 18 removed. As in the instrument 25, the instrument 26 is inserted into the hole 31 with a clearance fit far better than an optical axis misalignment level normally considered acceptable. Under the setup as mentioned above a helium-neon laser beam (hereinafter, simply referred to as laser beam), for example, is directed to the hole 27a at the center of the instrument 25 installed on the clamp 24. The helium-neon laser device is adjusted in positional setting so that the laser beam passes through the hole 27b at the center of the instrument 26. Indicated at 34 both in FIG. 12 and FIG. 13 is laser beam. Since the instruments 25 and 26 are made of translucent material, the laser beam creates a light spot on the areas of the instruments, if the laser beam fails to align with the holes. Such light spot allows the position of the beam axis to be visually located. After making sure that the laser beam passes through both the center hole 27a on the instrument 25 installed on the clamp 24 and the center hole 27b on the instrument 26, another instrument 25 is installed on one clamp 16 between the first instrument 25 and the instrument 26 as shown in FIG. 7. The clamp 16 is then adjusted and secured so that laser beam already set up passes through the center hole 27a of the instrument 16. This step is repeated until all clamps 16 are adjusted. After completing adjustment of all the clamps 16, the instrument 26 in FIG. 12 is removed, and is then refitted into the next hole (32 in FIG. 10) as shown in FIG. 13. The angle of the total-reflection mirror 28 is then adjusted with the adjusting screws 22 illustrated in FIG. 9 so that the laser beam passes through the center hole 27b on the instrument 26. Indicated at 21 is a total-reflection mirror unit having a total-reflection mirror 28. Next, the instrument 26 is removed from the hole 32, and the instrument 25 is installed on a clamp 23 (FIG. 9) at the end of the optical resonance zone after the total-reflection mirror 6 is removed. Both the accuracy of fit between the instrument 25 and the clamp 23 and the accuracy of fit between the clamp 23 and the optical bench are far better than an optical axis misalignment level normally considered as acceptable. After the total-reflection mirror 29 is installed on the bending unit 18 the angle of, the total-reflection mirror 29 is adjusted with an adjusting screw 22 so that laser beam passes through the center hole 27a on the instrument 25. Then, another instrument 25 is installed on one of clamps 16 arranged between the bending unit 18 and the clamp 23, and that clamp 16 is adjusted and secured so that laser beam passes through the center hole 27a on the instrument 25. Each of the clamps 16 should be adjusted as above. This completes the optical axis alignment adjustment in the entire optical resonance zone. If three or more discharge tubes are connected in series, similar additional adjustment are required between the bending unit and the total-reflection mirror at the end of the optical resonance zone.

In the above-mentioned prior art, the optical axis alignment procedure is complex and requires a high standard of adjusting skills, thereby consuming a great deal of time. The machining accuracies of the optical bench and other components have been improved in an attempt to shorten the time required for the optical axis alignment adjustment. Such an attempt has failed in achieving satisfactory results. Higher machining accuracy incurs higher machining costs. Furthermore, even high-accuracy components still result in cumulative errors thereby causing misalignment of the optical axis to occur, even to the extent that adjustment itself is impossible.

SUMMARY OF THE INVENTION

Accordingly, an essential object of the present invention is to provide a gas laser oscillation device and an optical axis alignment adjustment method therefor, wherein the machining costs are kept to a minimum, the time required for the optical axis alignment adjustment is substantially reduced, and no particular adjustment skill is required to carry out the adjustment.

In accomplishing these and other objects, according to the present invention, there is provided a gas laser oscillation device comprising:

an optical bench; a plurality of discharge tube columns, each of which includes a natural number n of discharge tubes mounted to the optical bench; an optical bending means, mounted to the optical bench, for optically connecting the discharge tube columns in series and thereby forming at least part of an optical path having first and second ends; a partial reflection mirror mounted to the optical bench at the first end of the optical path; a total reflection mirror mounted to the optical bench at the second end of the optical path; a plurality of clamps mounted to the optical bench along the optical path at opposing ends of the discharge tubes, respectively, for mounting the discharge tubes to the optical bench; and wherein the optical bending means comprises a bending unit body, a movable total-reflection mirror unit movably mounted to the bending unit body to allow for adjustment of an orientation of the total-reflection mirror unit in the optical path, and a non-movable total-reflection mirror unit substantially non-movably mounted to the bending unit body. The clamps along the optical path are sequentially designated by natural numbers beginning with clamp no. 1 which is mounted at an end of one of the discharge tubes which is nearest the first end of the optical path; clamp nos. 1 and 2•n•x, where x=a sequential series of natural numbers beginning at 1, are non-movable clamps non-movably secured to the optical bench; and clamps, of the plurality of clamps, other than clamp nos. 1 and 2•n•x are movable clamps adjustably mounted to the optical bench.

According to the above-mentioned device, by employing a minimum number of clamps which need no adjustment because of their high machining accuracy and by providing an adjustment-free total-reflection mirror at one side of the bending unit, intermediary clamps may be adjusted with respect to the reference optical axis which is set up in advance on the adjustment-free clamps using a laser beam, such as a helium-neon laser for adjustment of the optical axis. This requires no particular adjustment skill for carrying out the optical axis alignment, and substantially shortens the time required for the adjustment. Furthermore, the ratio of high accuracy components to the standard accuracy components is kept low, and the machining costs are likewise kept low.

The present invention allows criteria for the optical axis alignment adjustment to be clarified and also allows the optical axis alignment to be adjusted without removing the total-reflection mirrors of the bending units. No particular adjustment skills are thus needed, and the time required for the adjustment is substantially reduced. Furthermore, since the number of components which require high machining accuracy standards is kept to a minimum, the total cost involved is lowered. Since the accuracy of the optical axis alignment adjustment depends on the machining accuracy of the components, there will be no adjustment failures because of cumulative machining errors.

BRIEF DESCRIPTION OF THE DRAWINGS

These and other objects and features for the present invention will become apparent from the following description taken in conjunction with the preferred embodiment thereof with reference to the accompanying drawings, in which.

DETAILED DESCRIPTION OF THE INVENTION

Figure 1A:
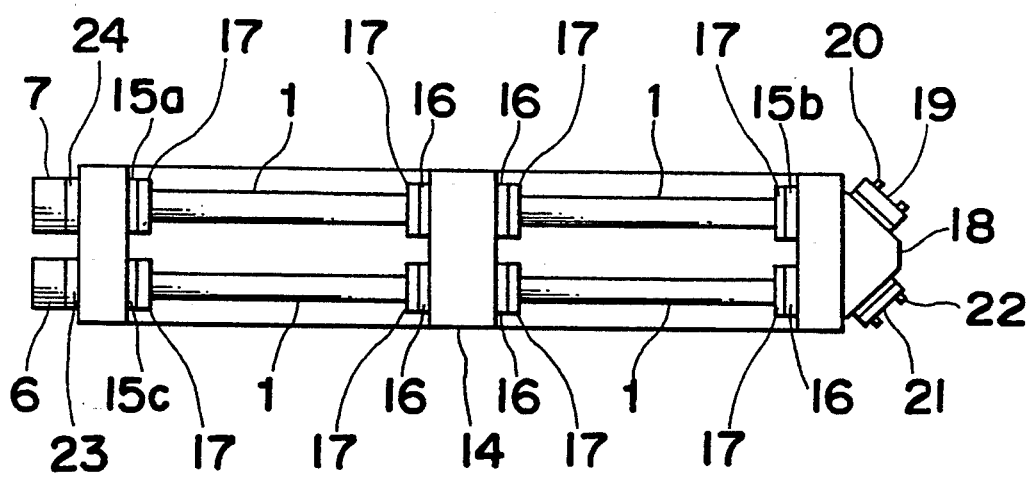
FIG. 1A is a plan view showing an optical resonator of a gas laser oscillation device according to the present invention.

Before the description of the present invention proceeds, it is to be noted that like parts are designated by like reference numerals throughout the accompanying drawings.

Figure 1B:
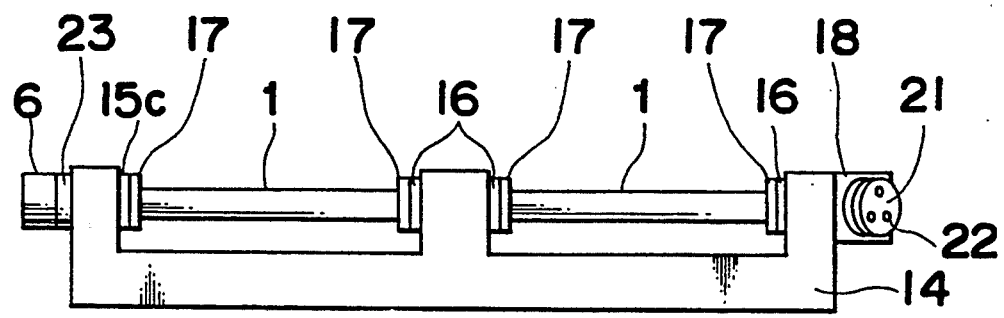
FIG. 1B is a front view showing the optical resonator of the gas laser oscillation device according to the present invention.

Referring first to FIGS. 1A and 1B, a discharge tube is designated 1. Designated 6 is a total-reflection mirror at one end of the optical resonance region; a partial-reflection mirror at the other end of the optical resonance region is designated 7; an optical bench is designated 14; 15a through 15c designate clamps which are machined to a high accuracy, 16 represents clamps which need adjusting in the conventional manner; 17 represents clamps secured to the discharge tubes 1; 18 represents a bending unit; 19 represents a non-movable total-reflection mirror unit having a total-reflection mirror which is secured, but still has fine adjustment capability; 20 represents a fine adjustment screw for the non-movable total-reflection mirror; 21 designates a movable (or adjustable) total-reflection mirror unit having an adjustable total-reflection mirror; 22 designates an adjustment screw for adjusting the adjustable total-reflection mirror; 23 represents a clamp which secures the total-reflection mirror 6 to one end of the optical resonance zone; and 24 designates a clamp which secures the partial-reflection mirror 7 to the other end of the optical resonance zone.

Among the above-mentioned components, clamps 15a, 15b and 15c are fixed to the optical bench 14 via a clearance fit having an accuracy far better than an optical axis misalignment level normally considered as acceptable, and these clamps thus need no adjustment. Since the non-movable total-reflection mirror unit 19 of the bending unit 18 is assembled to high accuracy standards in advance by means of a tool, no adjustment is required in principle once the non-movable total-reflection mirror unit 19 is installed on the bending unit 18. A fine adjustment screw is available on the non-movable total-reflection mirror unit 19 just in case the optical axis misalignment is not fully corrected with the adjustable total-reflection mirror unit 21 alone.

Figure 2A:
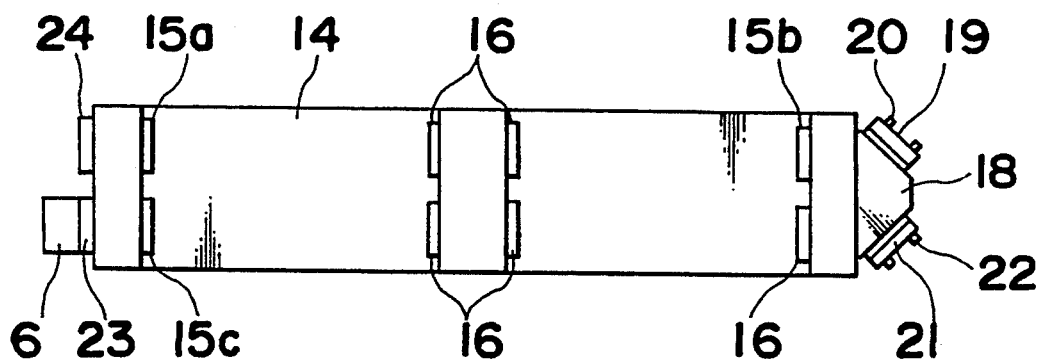
FIG. 2A is a plan view of the optical resonator for illustrating optical axis alignment adjustment.
Figure 2B:
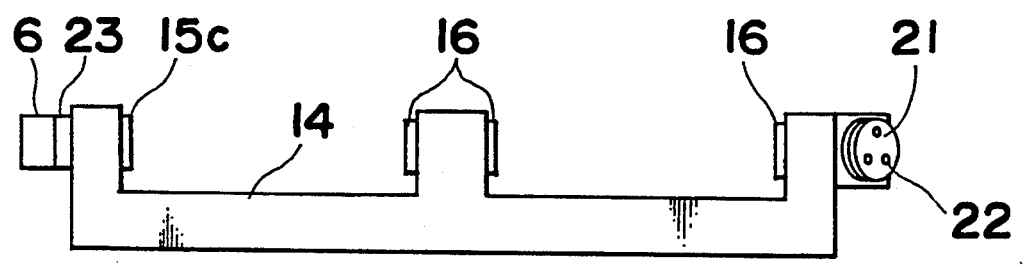
FIG. 2B is a front view of the optical resonator for illustrating the optical axis alignment adjustment.
Figure 3:
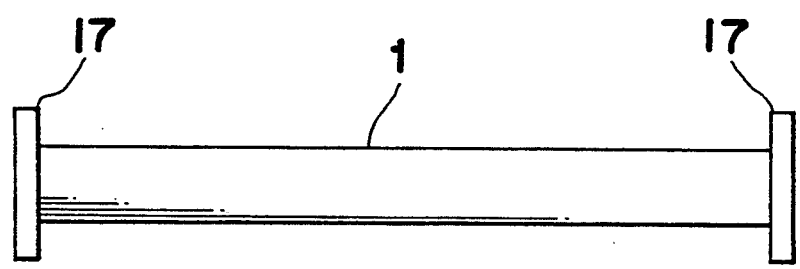
FIG. 3 shows a discharge tube.
Figure 4:
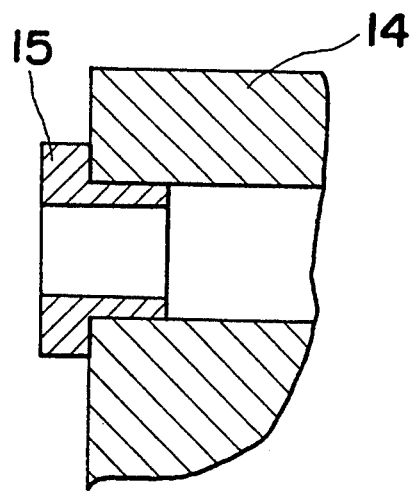
FIG. 4 is a view showing a non-adjustable clamp fitted into a mounting hole.
Figure 5:
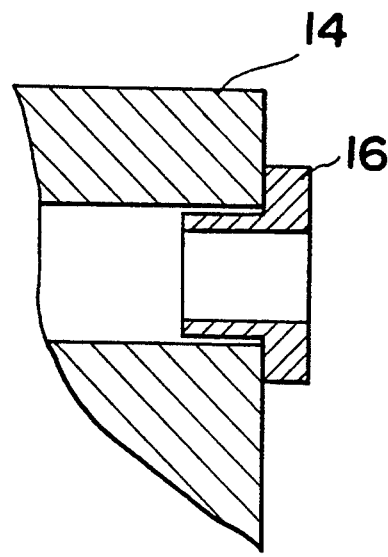
FIG. 5 is a view showing an adjustable clamp fitted into a mounting hole.
Figure 6:
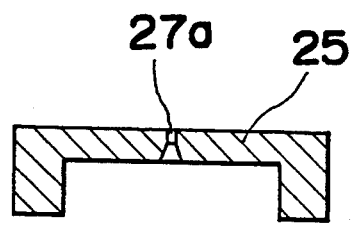
FIG. 6 is a cross-sectional view showing a visual inspection instrument for inspecting an optical axis.

Described next is the adjustment operation. Like the prior art already mentioned, clamps 17 are fixed to a discharge tube 1. FIG. 2 shows the front view of the optical resonator in FIG. 1, but without both the discharge tube portions shown in FIG. 3 and the partial-reflection mirror 7 on one end of the optical resonator. The adjustment operation of the optical axis alignment is carried out with the setup shown in FIG. 2.

Figure 7:
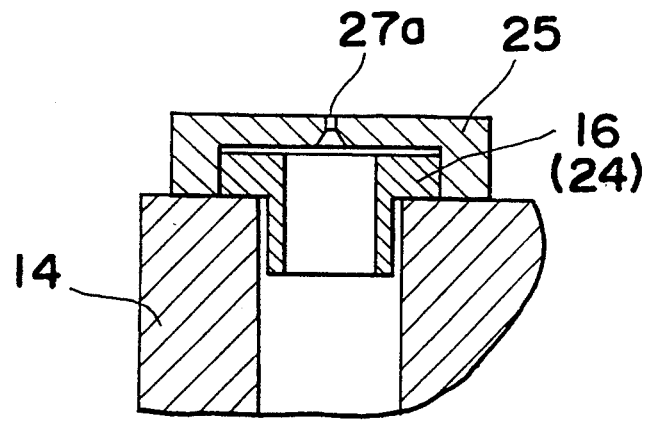
FIG. 7 shows the visual inspection instrument fitted to a clamp.
Figure 8:
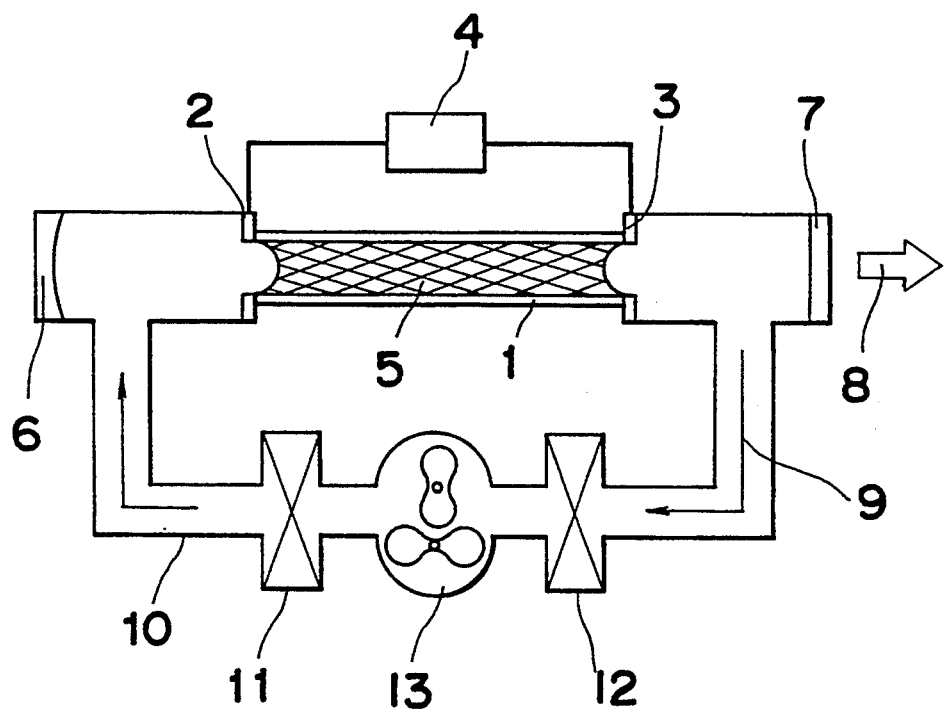
FIG. 8 shows a basic configuration of the gas laser oscillation device.
Figure 9A:
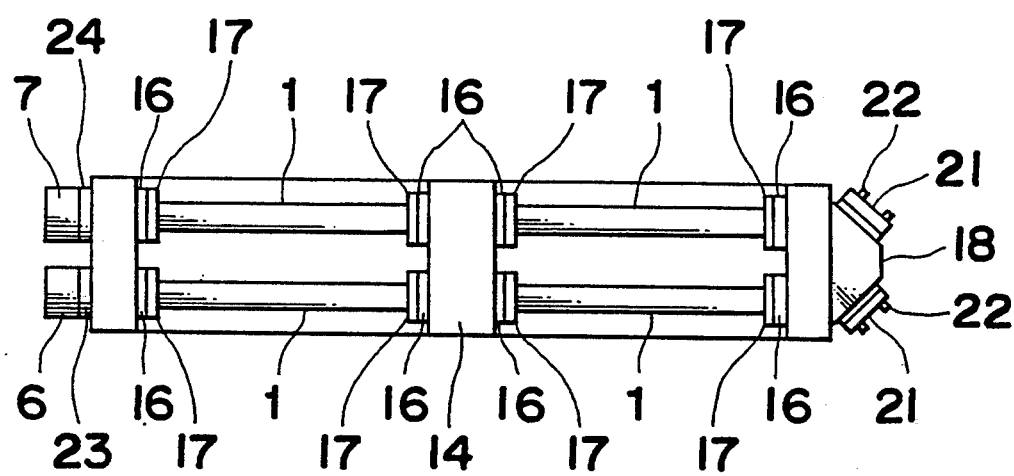
FIG. 9A is a plan view showing a prior art optical resonator.
Figure 9B:
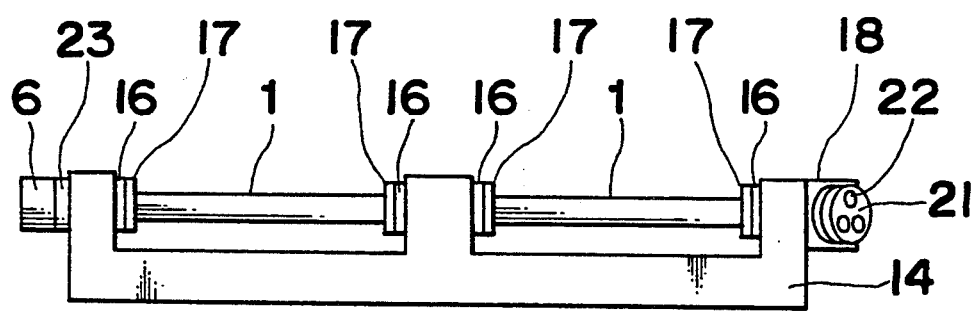
FIG. 9B is a front view showing the prior art optical resonator of FIG. 9A.
Figure 10:
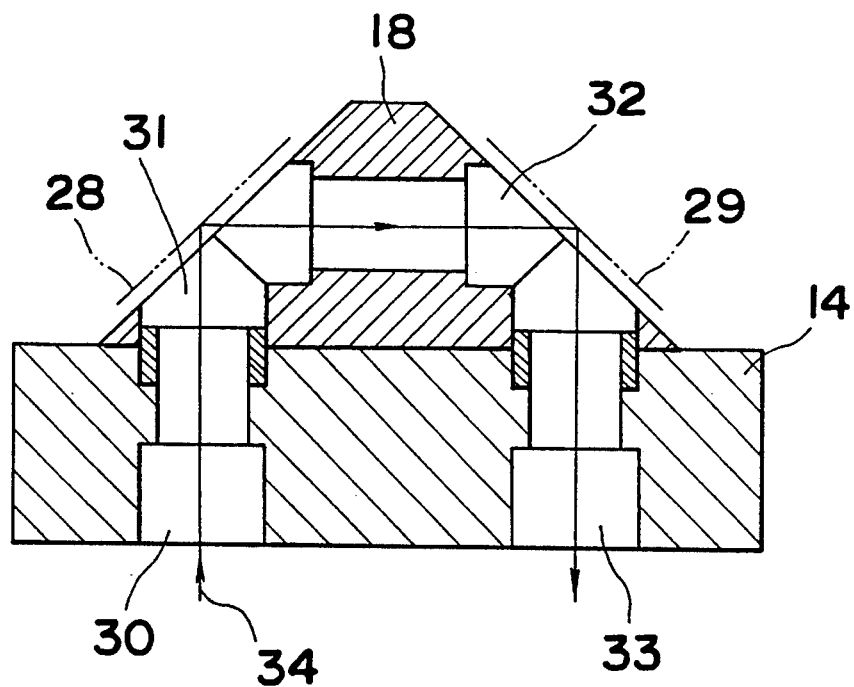
FIG. 10 is a cross-sectional view of a bending unit.
Figure 11:
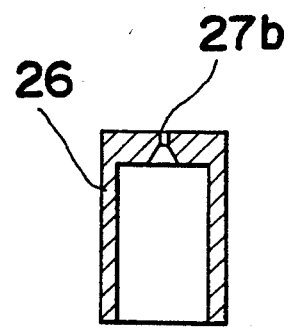
FIG. 11 is a cross-sectional view of a visual inspection instrument for the bending unit.
Figure 12:
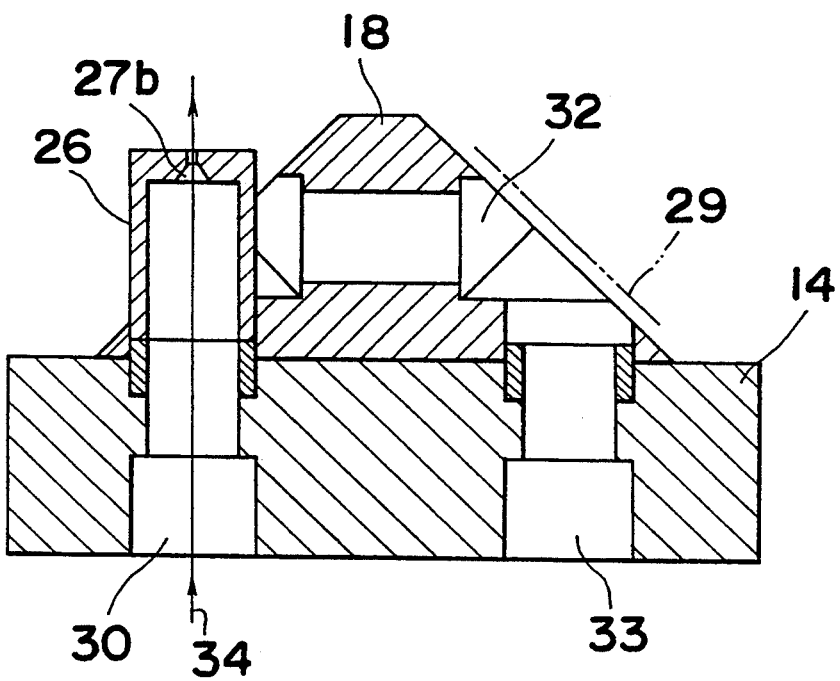
FIG. 12 is a cross-sectional view showing the visual inspection instrument fitted with the bending unit.
Figure 13:
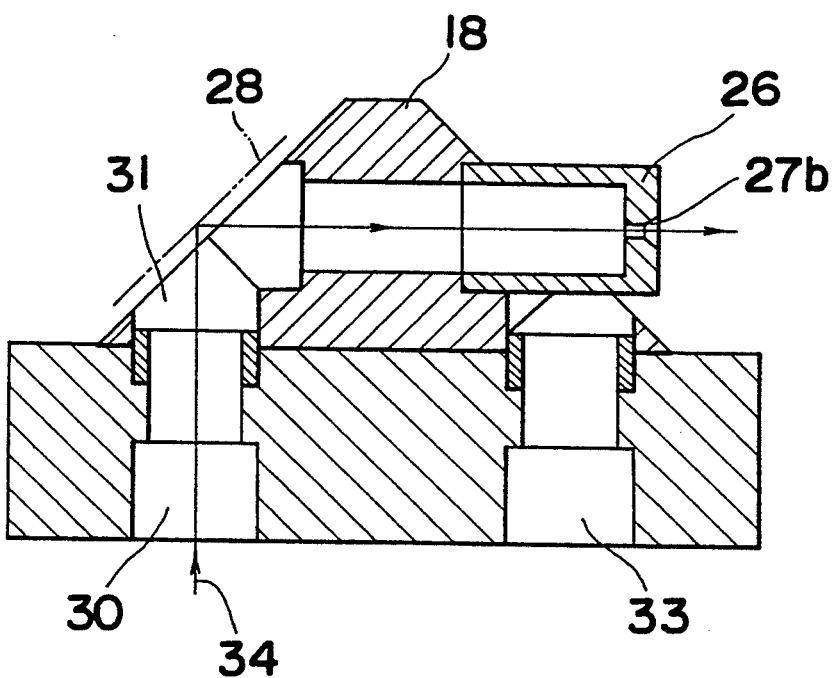
FIG. 13 is a cross-sectional view showing the visual inspection instrument fitted with the bending unit.

An instrument 25 is installed onto the clamp nearest to the partial-reflection mirror 7, i.e., clamp 15a, as illustrated in FIG. 7, and another instrument 25 is installed on the fourth clamp from the partial-reflection mirror 7, i.e., clamp 15b. In the same manner as the prior art, a laser beam is directed to the instrument 25 on the partial-reflection mirror side. A laser device for optical axis adjustment, such as a helium-neon laser device, is set up in position so that a laser beam passes through the center hole 27a of both instruments 25. The axis passing through both centers of clamps 15a and 15b is hereinafter used as the reference optical axis. After another instrument 25 is installed on one of the clamps 16 which are located along the reference optical axis between the clamp 15a and the clamp 15b, that clamp 16 is so that the laser beam passes through the center hole 27a of the instrument 25. Each of the clamps 16 located along the reference optical axis between the clamp 15a and the clamp 15b is adjusted as above. Next, an instrument 25 is installed on the eighth clamp, i.e. , clamp 15c. The adjustable total-reflection mirror 21 on the bending unit 18 is adjusted with the adjustment screw 22 so that the laser beam passes through the center hole 27a on the instrument 25 installed on the clamp 15c. The above adjustment allows the incident laser beam fed through the mounting portion of the partial-reflection mirror 7 to reach the total-reflection mirror 6 at the other end of the optical resonator. Adjusting the remaining clamps 16 completes the optical axis alignment adjustment. The optical resonator is fully assembled by fitting the discharge tube units shown in FIG. 3 into the clamps.

If three or more discharge tube columns are connected, with each column comprising two discharge tubes connected in series, each reference optical axis of adjustable total-reflection mirrors of a second bending unit and a third bending unit is set up by directing the laser beam from the center of a clamp, nearest to the partial-reflection mirror, to the center of a fourth clamp from the partial-reflection mirror, and then each intermediary clamp 16 is adjusted for the laser beam to properly pass therethrough.

In the above description, the optical axis alignment is adjusted by using, as a reference, the clamp located near the partial-reflection mirror of the optical resonator and by feeding the laser beam through that clamp. As a reference, however, a clamp located near the total-reflection mirror may be used. In such a setup, the partial-reflection mirror may be designated 6 and the total-reflection mirror may be designated 7 in both FIG. 1 and FIG. 2.

Although the present invention has been fully described by way of example with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

What is claimed is:

1. A gas laser oscillation device comprising:
   an optical bench;
   a plurality of discharge tube columns, each of which includes a natural number n of discharge tubes mounted to said optical bench, each of said discharge tubes having a longitudinal axis;
   an optical bending means, mounted to said optical bench, for optically connecting said discharge tube columns in series and thereby forming at least part of an optical path having first and second ends;
   a partial reflection mirror mounted to said optical bench at said first end of said optical path;
   a total reflection mirror mounted to said optical bench at said second end of said optical path;
   a plurality of clamps mounted to said optical bench along said optical path at opposing ends of said discharge tubes, respectively, for mounting said discharge tubes to said optical bench;

wherein said optical bending means comprises a bending unit body, a movable total-reflection mirror unit movably mounted to said bending unit body to allow for adjustment of an orientation of said total-reflection mirror unit in said optical path, and a non-movable total-reflection mirror unit substantially non-movably mounted to said bending unit body.

wherein said clamps along said optical path are sequentially designated by natural numbers beginning with clamp no. 1 which is mounted at an end of one of said discharge tubes which is nearest said first end of said optical path;

wherein clamp nos. 1 and 2•n•x, where x=a sequential series of natural numbers beginning at 1, are non-movable clamps non-movably secured to said optical bench, a reference optical axis being defined through centers of said non-movable clamps; and wherein clamps, of said plurality of clamps, other than clamp nos. 1 and 2•n•x are movable clamps adjustably mounted to said optical bench, such that each of said movable clamps is adjustable to align its center with said reference optical axis and comprises an alignment means for adjusting an orientation of the longitudinal axis of one of said discharge tubes.

2. An optical axis alignment method for a gas laser oscillation device including an optical bench; a plural number C of discharge tube columns, each of which includes a natural number n of discharge tubes respectively having longitudinal axes, said discharge tubes being optically connected in series by one or more optical bending units, each said optical bending unit being mounted at an end of an adjacent pair of said discharge tube columns, to form at least part of an optical path having first and second ends, each optical bending unit having a movable total reflection mirror unit and a substantially non-movable total reflection mirror unit; a partial reflection mirror mounted at the first end of the optical path; a total reflection mirror mounted at the second end of the optical path; and a plurality of clamps mounted to the optical bench at opposing ends of said discharge tubes, respectively, for mounting the discharge tubes to the optical bench, the clamps along the optical path being respectively designated successively along the optical path by natural numbers beginning with clamp no. 1 which is mounted at an end of one of the discharge tubes nearest one of the first and second ends of the optical path, clamp no. 1 being a first non-movable clamp; clamp no. 2•n being a second non-movable clamp; one or more clamp nos 4•n•x, where x=a series of natural numbers from 1 to C−1, being one or more additional non-movable clamps, a reference optical axis being defined through centers of said non-movable clamps; and others of said plurality of clamps being movable clamps, each of said movable clamps being adjustable to align its center with said reference optical axis and comprising an alignment means for adjusting an orientation of the longitudinal axis of one of said discharge tubes, said method comprising the steps of:

(a) fixing, to the optical bench, first ones of the movable clamps disposed between said first and second non-movable clamps, such that centers of said first ones of said movable clamps are in alignment with said reference optical axis passing through centers of the first and second non-movable clamps;

(b) successively carrying out one or more alignment steps for aligning the reference optical axis with centers of the one or more additional non-movable clamps by adjusting only the movable total-reflection mirror unit of a respective one of the one or more optical bending units, to thereby extend the reference optical axis; and (c) after each of said one or more alignment steps, fixing, to the optical bench, additional ones of the movable clamps disposed along the portion of the reference optical axis extended in the last alignment step, in such a manner that centers of the additional ones of the movable clamps are aligned with the reference optical axis.

3. A gas laser oscillation device comprising:

an optical bench;

a plurality of discharge tube columns, each of which includes a natural number n of discharge tubes mounted to said optical bench, each of said discharge tubes having a longitudinal axis;

an optical bending means, mounted to said optical bench, for optically connecting said discharge tube columns in series and thereby forming at least part of an optical path having first and second ends;

a partial reflection mirror mounted to said optical bench at said first end of said optical path;

a total reflection mirror mounted to said optical bench at said second end of said optical path;

a plurality of clamps mounted to said optical bench along said optical path at opposing ends of said discharge tubes, respectively, for mounting said discharge tubes to said optical bench;

wherein said optical bending means comprises a bending unit body, a movable total-reflection mirror unit movably mounted to said bending unit body to allow for adjustment of an orientation of said total-reflection mirror unit in said optical path, and a non-movable total-reflection mirror unit substantially non-movably mounted to said bending unit body;

wherein said clamps along said optical path are sequentially designated by natural numbers beginning with clamp no. 1 which is mounted at an end of one of said discharge tubes which is nearest said first end of said optical path;

wherein clamp nos. 1 and 2•n•x, where x=a sequential series of natural numbers beginning at 1, are non-movable clamps non-movably secured to said optical bench, a reference optical axis being defined through centers of said non-movable clamps; and wherein clamps, of said plurality of clamps, other than clamp nos. 1 and 2•n•x are movable clamps adjustably mounted to said optical bench, such that each of said movable clamps is movable perpendicularly to said reference optical axis to align its center with said reference optical axis and comprises an alignment means for adjusting an orientation of the longitudinal axis of one of said discharge tubes.

4. An optical axis alignment method for a gas laser oscillation device including an optical bench; a plural number C of discharge tube columns, each of which includes a natural number n of discharge tubes respectively having longitudinal axis, said discharge tubes being optically connected in series by one or more optical bending units, each said optical bending unit being mounted at an end of an adjacent pair of said discharge tube columns, to form at least part of an optical path having first and second ends, each optical bending unit having a movable total reflection mirror unit and a substantially non-movable total reflection mirror unit; a partial reflection mirror mounted at the first end of the optical path; a total reflection mirror mounted at the second end of the optical path; and a plurality of clamps mounted to the optical bench at opposing ends of said discharge tubes, respectively, for mounting the discharge tubes to the optical bench, the clamps along the optical path being respectively designated successively along the optical path by natural numbers beginning with clamp no. 1 which is mounted at an end of one of the discharge tubes nearest one of the first and second ends of the optical path, clamp no. 1 being a first non-movable clamp; clamp no. 2•n being a second non-movable clamp; one or more clamp nos. 4•n•x, where x=a series of natural numbers from 1 to C−1, being one or more additional non-movable clamps, a reference optical axis being defined through centers of said non-movable clamps; and others of said plurality of clamps being movable clamps, each of said movable clamps being movable perpendicularly to said reference optical axis to align its center with said reference optical axis and comprising an alignment means for adjusting an orientation of the longitudinal axis of one of said discharge tubes, said method comprising the steps of:

(a) fixing, to the optical bench, first ones of the movable clamps disposed between said first and second non-movable clamps, such that centers of said first ones of said movable clamps are in alignment with said reference optical axis passing through centers of the first and second non-movable clamps;

(b) successively carrying out one or more alignment steps for aligning the reference optical axis with centers of the one or more additional non-movable clamps by adjusting only the movable total-reflection mirror unit of a respective one of the one or more optical bending units, to thereby extend the reference optical axis; and (c) after each of said one or more alignment steps, fixing, to the optical bench, additional ones of the movable clamps disposed along the portion of the reference optical axis extended in the last alignment step, in such a manner that centers of the additional ones of the movable clamps are aligned with the reference optical axis.

* * * * *